United States Patent Office 3,562,746
Patented Feb. 9, 1971

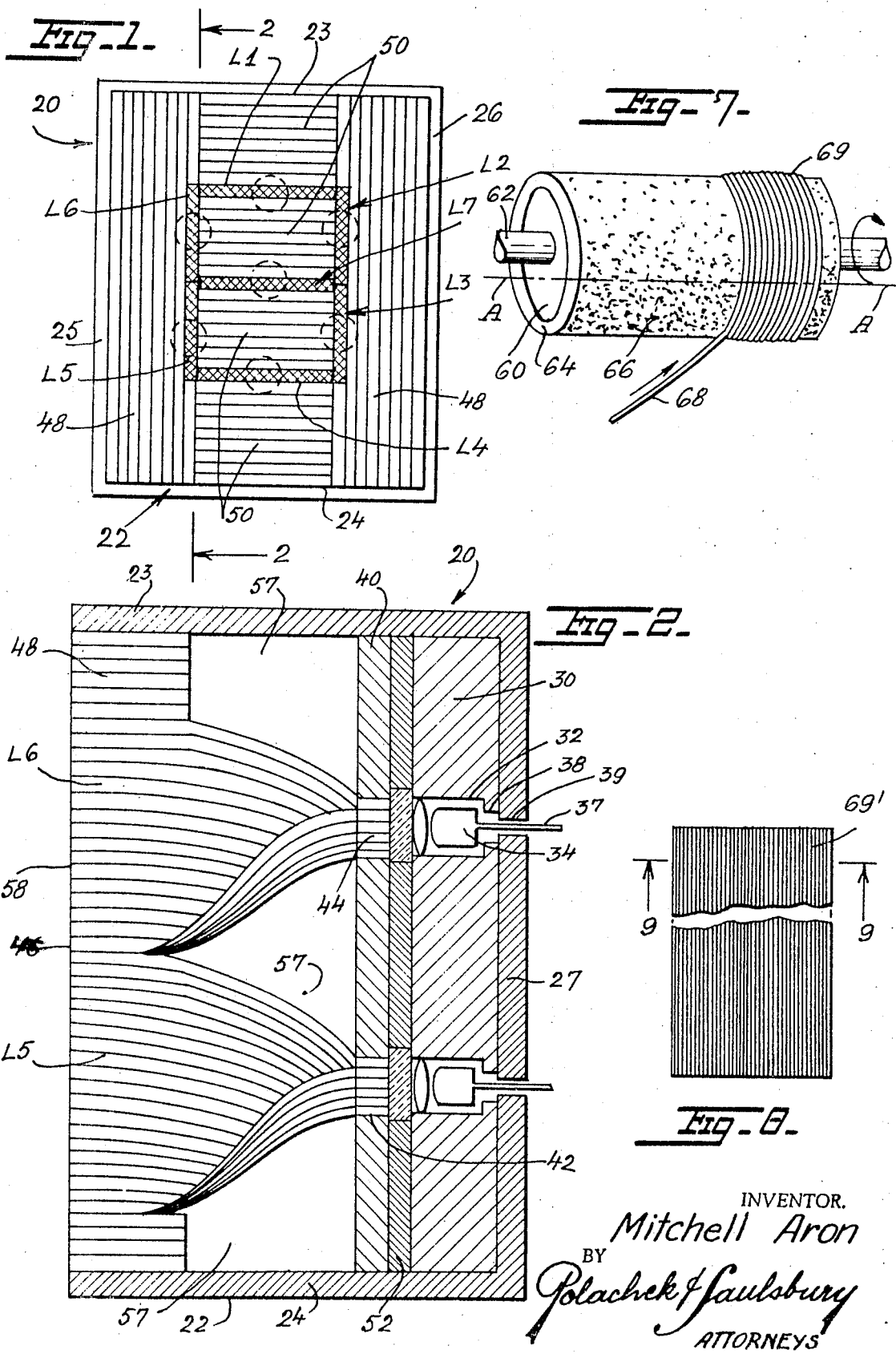

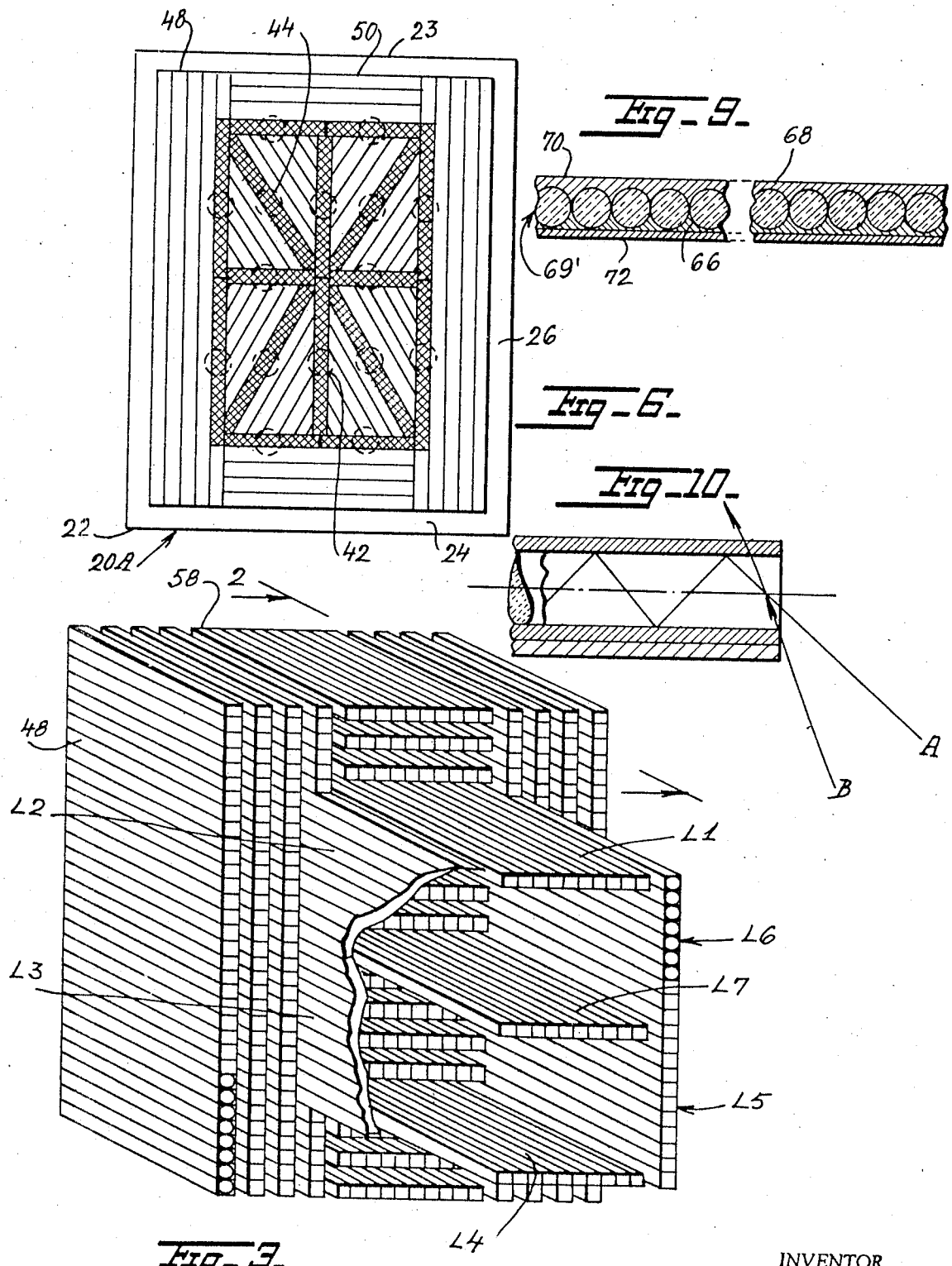

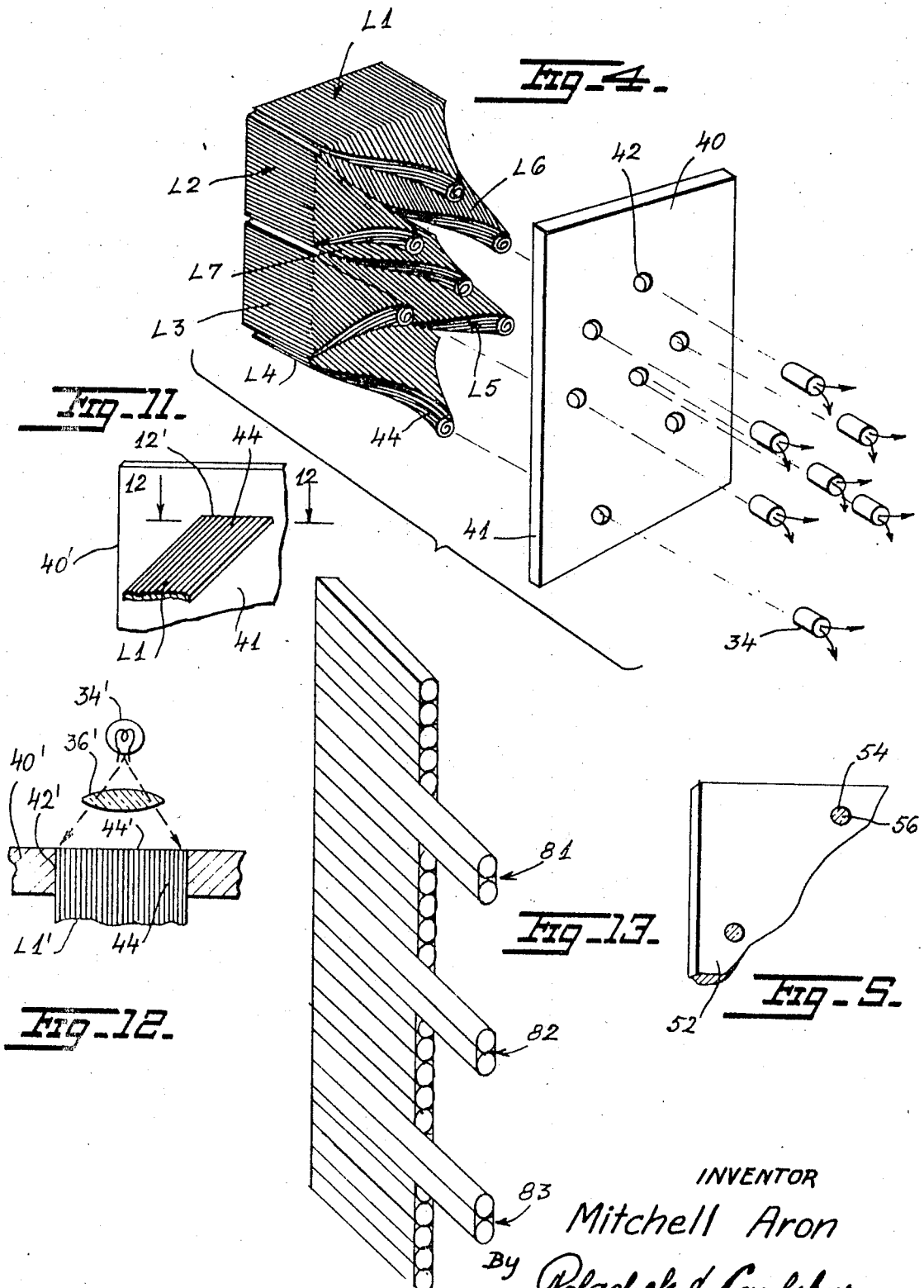

3,562,746
CHARACTER DISPLAY DEVICE EMPLOYING OPTICAL LAMINAS OF LIGHT PIPING ELEMENTS
Mitchell Aron, 38 Ridge Road, Harrington Park, N.J. 07640
Filed Dec. 12, 1968, Ser. No. 783,308
Int. Cl. G08b 5/00
U.S. Cl. 340—380
5 Claims

ABSTRACT OF THE DISCLOSURE

A character display device employs a plurality of optical laminas formed of juxtaposed optical fibers to serve as light guides. Selected fibers in certain ones of the laminas are backed up by selectively operated lamps to display characters at front ends of laminas. The laminas are fabricated into a display device so that they absorb the ambient light impinging on their front ends. Thus, the display device appears black in the absence of internal illumination from the lamps. Illuminated lamina present luminous lines against a black background even in the presence of high ambient light levels.

This invention relates generally to devices for displaying characters such as letters, numerals, symbols, and the like, and more particularly concerns a character display device employing optical laminas.

Alphanumeric display systems are widely employed to provide visible readouts of alphabetical and numerical data. One common form of display device has seven segments or lines arranged in a geometrical pattern substantially defining a figure 8. Lamps disposed adjacent to the pattern selectively illuminate the lines to display any desired digit in the series 0, 1, 2, 3 . . . 9. Typical devices of this kind are described in U.S. Pats. 2,765,458; 3,252,158 and others. It is also known to provide a device having a geometric pattern of sixteen selectively illuminated segments or lines for display of an almost unlimited number of different digits, letters and symbols.

In the display devices mentioned, various means are employed to provide uniformity of brightness over the full length of area of the individual lines or segments of a geometric pattern. In one system, translucent light diffusing panels are placed in front of the segments of a pattern with illuminating lamps behind the segments. In another system, the segments are hollow members. The inside walls of the segments are painted white to cause the segments to be illuminated by internally generated light diffused from the walls. In a further system, a multiplicity of optical fibers arranged as light pipes fill each segmental area thereby spreading the light over the entire segment.

All of the devices described are viewed in ambient light but make use of internal self-contained illuminating light sources to create the alphanumeric display. The ambient light in which the displays are viewed is at least partially reflected in random ways from various portions of the segments that form the displayed character. In locations having a high ambient light levels, the internally illuminated characters appear washed out and may even be unreadable. To compensate for this objectionable condition, various types of filters have been employed to improve contrast and perceptability. These filters have been only moderately successful in reducing the effects of ambient light, and always at a cost of increased lamp power.

The present invention is directed to overcoming the above and other difficulties encountered with conventional alphanumeric display devices employed in locations of relatively high ambient light levels.

The present invention provides a display device which is easily readable even in direct sunlight and this is accomplished without use of special high power consuming, high intensity lamps.

It is therefore a principal object of the invention to provide an improved character display device readable in locations of high ambient light levels.

A further object is to provide an improved character display device which affords high contrast between internally illuminated display areas and non-illuminated segments and surrounding areas.

A further object is to provide a display device which employs both illuminated and non-illuminated optical laminas which are designed into the display device so that the optical laminas are, at the same time, capable of transmitting illumination generated within the display device, and also of absorbing illumination from outside the display device.

Another object is to provide a character display device which employs optical fiber light guides both for internally illuminated segments of a character display and for non-illuminated areas of the display.

Another object is to provide a novel method for making laminar light guides employing optical fibers.

Another object is to provide a device means for segregating light guides into bundles which will define desired shapes, when the shapes are not conveniently formed by individual optical laminas.

A further object is to make a display whose source of illumination is not necessarily located in a plane perpendicular to the viewing surface. This display will be capable of illumination from sources located randomly with respect to said viewing surface. An advantage to be obtained from this technique is a minimization of the display depth behind the viewing area.

A further object is to define a display device that will be capable of presenting, in addition to stated alpha or numeric characters or independent of these presentations, random geometrical patterns in a manner as described herein.

A further object is to indicate that the laminars used to transmit the light to the viewing surface may be deliberately formed in different widths so as to develope specialized presentations.

A further object is to define a device using light sources to illuminate a viewing surface using light pipes whose terminus at one end is a single light source but on the viewing surface may be placed light absorbing coating so as to yield none adjacent illuminated areas.

Various objects, features and advantages of the invention will become apparent upon reading the following specification together with the acompanying drawing forma part thereof.

Referring to the drawing:

FIG. 1 is a front elevational view of a character display device embodying the invention, wherein the illuminated portions of the optical laminas are shown cross-hatched.

FIG. 2 is an enlarged vertical sectional view taken on line 2—2 of FIG. 1.

FIG. 3 is an exploded perspective view (from the rear of the display) of an assembly of optical laminas employed in the device of FIGS. 1 and 2 showing the appearance of the optical laminas during assembly.

FIG. 4 is an exploded perspective view of parts of the device of FIGS. 1 and 2.

FIG. 5 is an oblique plan view of a portion of a filter plate employed in the device.

FIG. 6 is a front view similar to FIG. 1 of another character display device.

FIG. 7 is an oblique side view of a mandrel shown at one stage of fabricating an optical lamina thereon.

FIG. 8 is a plan view with portions broken away of an optical lamina per se.

FIG. 9 is a greatly magnified cross-sectional view, with portions broken away, taken on line 9—9 of FIG. 8.

FIG. 10 is a longitudinal section of an optical fiber.

FIG. 11 is a fragmentary perspective view of an end of an optical lamina and part of a support plate.

FIG. 12 is an enlarged fragmentary sectional view taken on line 12—12 of FIG. 11.

FIG. 13 is a single optical lamina.

Referring first to FIGS. 1–5, there is shown a character display device 20 enclosed in a rectangular box-like housing 22 having top, bottom, side and rear walls 23–27 and an open front. Set in the housing at the rear thereof is a block 30 having a plurality of recesses 32, the walls of which are painted or otherwise processed with dull black paint or other light absorbing means. Into each of the recesses are set illuminating lamps 34. Wires 37 from rear ends of the lamps extend through passages 38 in block 30 and openings 39 in rear wall 27. These wires are connected in suitable circuitry which energizes selected numbers of lamps in predetermined ways employed for character display purposes.

Disposed forwardly of the lamps is a plate 40 having seven holes 42 aligned with the lamps. Set in holes 42 are cylindrical rear ends 44 of seven light guides L1–L7. The forward ends 46 of the light guides all terminate in a flat plane and define a rectangular figure 8 pattern as clearly shown in FIG. 1. Surrounding the light guides L1–L7 are vertically disposed flat laminar light guides 48 and horizontal flat laminar light guides 50. Light guides 48 and 50 terminate at their rear ends in an open volume 57 in front of plate 40. The surface of plate 40 and all other surfaces that serve to enclose volume 57 are painted or otherwise processed with dull black paint or other light absorbing means. The front ends of light guides 48 and 50 terminate together with L1–L7 to form the front face 58 of the display surface as shown in FIG. 1. A filter plate 52 shown in FIGS. 2 and 5 can be provided. This plate has holes 54 in which are set transparent colored filters, as for example, red, blue or green lens filters 56. The lens filters are aligned with the lamps and rear ends 44 of the light guides L1–L7. The filter plate is shown interposed between plate 40 and block 30 in FIG. 2. The filters cause colored alphanumeric displays.

As described above, the front face 58 of the display as shown in FIGS. 1 and 2, is comprised of the front ends of the optical laminas 48, 50 and L1–L7. The rear ends of the light guides that form L1, L4 and L7 are arranged so that they can be internally illuminated with lamps 34. Similarly, the rear ends of selected fibers in the laminas which serve to make up light guides L2, L5 and L6 can also be internally illuminated. These light guides will be referred to at the internally illuminated light guides. All other light guides will be referred to as background light guides.

Ambient light that falls on the front face 58 of the display surface within the acceptance angle of the light guides will be transmitted by all the light guides that make up the front face 58. Thus, ray A in FIG. 10 which is within the acceptance angle will be transmitted as shown down the light guide, as will all similar light rays falling on the display surface. In the case of the background light guides, the light will emerge at the rear ends into the open volume 57, the surface of which has been treated to absorb light. This treatment can be a dull black paint, a black louvered surface, or similar processing which will minimize the amount of light that will be reflected or reradiated when light from the light guides fall on it. With the light thus absorbed on the surface of volume 57, the front ends of the background light guides will appear dark or black.

In the case of the internally illuminated light guides, the ambient light will also emerge into volumes which have been treated to absorb light. These volumes, recesses 32, however, also contain lamps 34. The presence of these lamps will, however, only serve to scatter the light in a random fashion depending upon the angle at which each ray strikes the glass in the lamp. The light is, however, eventually absorbed by the walls of recesses 32. Thus, when not illuminated by lamps 34, the internally illuminated light guides will appear to be dark or black in the present of ambient light on the front face of the display. Thus, ambient light cannot washout the internally illuminated light guides and a high contrast display is achieved.

It should be noted that some of the ambient light will fall on the front face 58 of the display surface at angles that are outside of the acceptance angle of the light guide, as for example, indicated by light ray B in FIG. 10. These rays will not be transmitted down the light guides, but will be transmitted through the walls of the light guides there to be absorbed.

Similarly suitably formed laminas can be used to form even complicated patterns as shown in FIG. 6.

There will be some display patterns wherein the segregation of the optical light guides in the display will create a practical manufacturing problem. To do this, a projector means suitably mounted in a holder fixed relative to the display surface is used to sequentially project one segment onto the display surface, thereby illuminating the desired optical light guides and thus identifying them for segregation at the opposite end. Another means is to place the display into a holder means against windows or holes that are sequentially illuminated.

The display device described above is shown in FIG. 3, to be constructed of optical laminas that are both vertical and horizontal. It is obvious that the display can be constructed in a manner where the laminas are stacked or configured in other orientations. Thus, for example, a display can be constructed entirely of vertical laminas, whereas a single optical lamina is used to form L1, for example, a number of vertical laminas, as shown in FIG. 13, would be stacked vertically wherein the horizontal line of light guides formed by 81 would combine to form the equivalent of L1. Similarly, 82 and 83 would form the equivalent of L7 and L4, respectively.

A method of fabricating a laminar light guide is illustrated by FIGS. 7–10. A cylindrical mandrel 60 rotatably supported on a shaft 62 has a cylindrical jacket 64 of polytetrafluoroethylene or other synthetic to which adhesives will not readily stick. The jacket on which there is a pressure sensitive adhesive 66 is secured to the mandrel. An optical fiber 68 is shown being wound with juxtaposed contacting turns around the mandrel which is continuously rotating while the fiber is fed from a spool (not shown) to form coil 69. After the mandrel has been wound with a coil 69 of sufficient axial length, fiber 68 is cut. After the adhesive 66 has set, the cylindrical coil 64 is cut lengthwise on a line A—A and the coil is stripped from the jacket 64 and flattened out to form a flat sheet 69' shown in FIG. 8. Before or after removal from the mandrel a flexible coating 70 is applied to the outer side of the sheet to aid in keeping the light guides or fibers in position (see FIG. 9). The adhesives 66 and 70 secures the fibers 68 parallel to each other to define the optical lamina.

The light guides L1–L7 and laminas 48, 50 can all be made by the method described. The light guides L1–L7 can be curled or bunched at their rear ends to form cylindrical portions 44 which fit into holes 42 in plate 40. The laminas 48 and 50 will remain flat.

It should be noted that the mandrel shown in FIG. 7 can also be made oval or even flat on the side. This would be important where it is desired that the optical laminas not experience any curl during assembly.

The successful operation of the present invention is based on the physical fact that the ability to read a displayed character is determined by the relative brightness of the illuminated portions of the display as compared with the non-illuminated portions. The absolute brightness of the display does not determine legibility. In the present invention, ambient light impinging on the transparent front ends of the fibers in the optical laminas is transmitted down the fibers into a volume in which the light is absorbed so that the front ends of the fibers appear to be black. The display surface of the device 20 thus appears black even in bright sunlight and regardless of the intensity of ambient illumination. When certain laminas forming segments of the display pattern are internally or back lighted, the front ends of the fibers in the selected laminas become luminous and highly visible to appear as bright lines and this occurs regardless of the intensity of ambient illumination.

Instead of a figure 8 pattern having seven segments as shown in FIG. 1, a device 20a shown in FIG. 6 can be constructed with sixteen optical laminar segments 46' defining a square or rectangle with crossed diagonals and crossed central lines. Other parts of device 20a corresponding to those of device 20 are identically numbered. Device 20a will provide alpha-numeric displays of any desired configuration. This display device can be made as shown in FIG. 6, wherein the laminas are placed in such a way that a single (one or more parallel laminas) lamina will be used to form each illuminated segment. Another method for making this display would be to use laminas that are all vertical or all horizontal and combining light guides in different laminas to form the desired segments. It may also be desirable to use the device noted above to aid in segregating the optical light guides into bundles which will constitute each lighted segment.

While I have shown that the lamps in the display are disposed immediately behind the front face of the display, it is obvious that since the light guides or fibers are flexible, the lamps can be placed essentially in the same plane as the front face of the display. This would be desirable in many places where a thin panel is desired or where the display is an integral part of the panel or moulded into the panel.

While I have noted that the front of the panel is flat, it is obvious that the panel can also be made with a curvature. This may be desirable in some applications.

There will be some cases where the lamps used to illuminate the rear ends of the laminas should be provided with lenses. These lenses can be separate or part of the lamp envelope.

The present invention can be used in a great variety of applications, such as aircraft display systems, computer readouts, and the like. The internal light sources or lamps for the laminas can provide coherent or non-coherent light rays. The filters shown in FIGS. 2 and 5 can be omitted or can be provided with a sliding feature in which different filters can be used depending on application requirements. Instead of forming the rear ends of the light guides in cylindrical form, they can be left flat and fitted into slots or slits formed in the supporting plate. This is shown in FIGS. 11 and 12 where flat rear end portion 44' of a light guide L1' is fitted into a straight slit 42' in support plate 40'. The light of lamp 34' located behind the plate is focused via lens 36' on the exposed straight rear end 44' of the light guide exposed at the rear end of the slit.

What is claimed is:

1. A display device, comprising a multiplicity of longitudinally transparent laminas disposed adjacent to each other in side-by-side contact, each lamina comprising a multiplicity of light transmitting optical fibers laterally juxtaposed to each other; binding layers on opposite sides of each lamina securing the fibers in the laterally juxtaposed position, all of said laminas terminating at front ends thereof in a front plane, rear ends of certain ones of said lamina being exposed to selectively energizable light sources for displaying variable light patterns in said front plane, rear ends of the other ones of said laminas being shielded from said light sources to absorb completely light impinging on front ends of said other laminas and to present, at said front plane a deep black background for light patterns displayed by said certain laminas at said front plane.

2. A display device as defined in claim 1, wherein the front ends of said certain laminas are straight and arranged in an array to display illuminated alphanumeric characters, said other laminas being disposed both inside and outside said array to provide said black background for each displayed illuminated character.

3. A display device as defined in claim 1, wherein the rear ends of each of said certain laminas is rolled into cylindrical form for exposure to individual light sources.

4. A display device as defined in claim 3, further comprising an opaque support having a plurality of spaced holes, the rolled ends of said certain laminas being disposed in said holes respectively; and a plurality of lamps disposed adjacent said opaque support and arranged for illuminating respectively individual rolled ends of said certain lamina.

5. A display device as defined in claim 4, further comprising transparent light filters disposed between said lamps and the rolled ends of said certain lamina for coloring the light patterns displayed at said front plane.

References Cited

UNITED STATES PATENTS

| | | | |
|---|---|---|---|
| 2,881,976 | 4/1959 | Greanias | 340—380 |
| 3,253,274 | 5/1966 | Berman | 340—380 |

HAROLD I. PITTS, Primary Examiner

U.S. Cl. X.R.

340—366, 378